(No Model.)
J. G. KENYON.
VEHICLE AXLE.
No. 409,362. Patented Aug. 20, 1889.
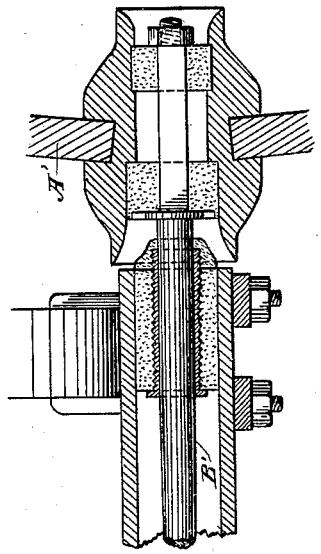
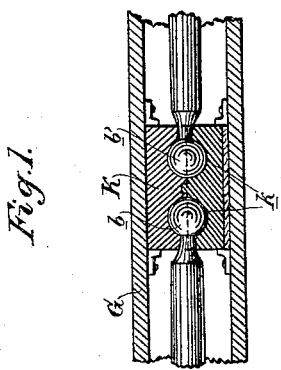
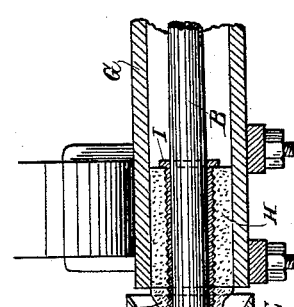
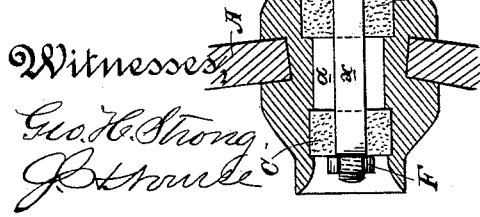
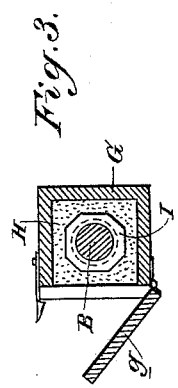
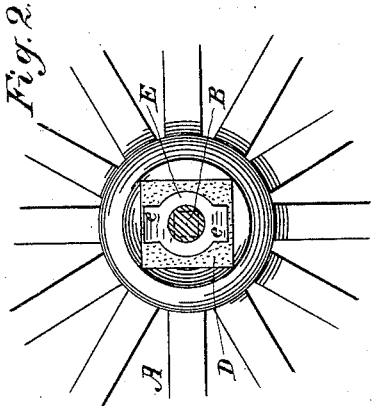
Witnesses
Geo. H. Strong
Inventor,
J. G. Kenyon
By Dewey & Co.
att'ys

UNITED STATES PATENT OFFICE.

JACOB GARDNER KENYON, OF PORT KENYON, CALIFORNIA.

VEHICLE-AXLE.

SPECIFICATION forming part of Letters Patent No. 409,362, dated August 20, 1889.

Application filed December 28, 1888. Serial No. 294,868. (No model.)

*To all whom it may concern:*

Be it known that I, JACOB GARDNER KENYON, of Port Kenyon, Humboldt county, State of California, have invented an Improvement in Vehicles; and I hereby declare the following to be a full, clear, and exact description of the same.

My invention relates to that class of vehicles in which the wheels are attached to and rotate with independent axles.

My invention consists in the novel means for attaching the wheel to its axle, the novel bearings for the opposing axles, the casing or box in which they are confined, and details of construction, all of which I shall hereinafter more fully describe.

The object of my invention is to provide a suitable and practical construction in which each wheel, though secured to and rotating with its axle, shall have sufficient play to avoid too great rigidity, and also to provide a simple and effective support for the independent axles from hub to hub.

Referring to the accompanying drawings for a more complete explanation of my invention, Figure 1 is a longitudinal section of my improved vehicle-axle and connections. Fig. 2 is a cross-section of same at the inner hub-connection. Fig. 3 is a cross-section of the axle through the outer bearing I and cushion H.

A is one wheel of a vehicle, and A' is the opposing wheel.

B is the axle of wheel A, and B' is the axle of wheel A'. These axles are secured in the hubs of the wheels in such a manner that wheel and axle rotate together and not the wheel on the axle, as is the case in ordinary vehicles. The connection between wheel and axle is as follows: The socket $a$, through the hub of the wheel, is larger in diameter than the axle which passes through it. In the outer end of the hub is made a square socket, in which is fitted a square cushion or buffer C, of rubber, and a similar square cushion or buffer D is fitted in a square socket in the inner end of the wheel-hub. The axle passes through these cushions in square sockets, and is itself squared, as shown at $x$.

The axle has a collar E firmly secured to or turned with it, which collar bears against the end of the inner cushion D, and is secured thereto by being let into it and having flanges $e$. The outer end of the axle is threaded and receives a nut F, which when set up bears against the end of the outer cushion C.

It will be seen that by tightening up this nut the wheel and axle are secured firmly to each other and rotate together. The cushions C and D allow the wheel to have enough play on the axle to avoid too great a rigidity of connection, and this play is without that friction which attends the free movement of a wheel rotating about the spindle of an ordinary axle.

G is a four-sided box extending between the hubs of the opposing wheels and inclosing the axle. This box has a hinged side $g$ adapted to be opened to afford access to its interior. This box has the double function of serving as a support for the top rigging of the vehicle and also as a bearing for the opposing axles. The manner in which it subserves this latter purpose is as follows: In the ends of the box is fitted a cushion H, of rubber. Into this is screwed the externally-threaded gland-nut I, forming a bearing for the axle-journal. The end of this bearing projects beyond the cushion H and receives a screw-cap J, of rubber, which laps over and binds down upon and about the axle, thus serving as a guard to prevent the entrance of dust to the journal; or, if preferred, the cap J may be part of the cushion H. At the middle of the box G is a bearing K for the inner or free ends of the axles. This bearing is a two-part one, fitted and secured in guides within the box, and having sockets $k$, in which the spherical ends $b$ and $b'$ of the axles B and B' are fitted, and said bearing is secured and held together by being confined in the box G between suitable guides. By opening the hinged side $g$ of the box G this center bearing may be reached for oiling or for the purpose of slipping its parts out when necessary, the axles yielding enough in the cushions H to permit this. The journals of the axles are thus kept free from dust, and the box G is sufficiently strong to serve as a support for the axles.

Having thus described my invention, what I claim as new, and desire to secure by Letters Patent, is—

1. In a vehicle, the wheel and the axle secured thereto so that both rotate together, in combination with cushions in the wheel-hub for affording the wheel a slight play on the axle, substantially as herein described.

2. In a vehicle, the axle and the wheel having a hub through which the axle freely passes, in combination with cushions between the wheel-hub and axle, securing them to each other so that both rotate together and the wheel may have a play on its axle, substantially as herein described.

3. In a vehicle, the square-ended axle and the wheel having a hub through which the axle end passes freely, in combination with the square cushions C and D, seated in square sockets in the ends of the hub and squared upon the axle end, substantially as herein described.

4. In a vehicle, the square-ended axle and the wheel having a hub through which the axle end passes freely, said hub having square sockets in its ends, in combination with the cushions C and D in said sockets and squared on the axle end, the fixed collar on the axle bearing against the inner cushion D, and the nut on the outer end of the axle bearing against the outer cushion C, substantially as herein described.

5. In a vehicle, the opposing wheels A A' and the independent axles B B', in combination with the cushions C and D in the wheel-hubs securing the axles to the wheels, so that each wheel and its axle rotate together, and a common bearing for receiving and supporting the independent axles between the wheels, substantially as herein described.

6. In a vehicle, the independent axles B B', each having a wheel secured to it so that wheel and axle rotate together, in combination with the box G, confining the axles between the wheels and extending from hub to hub, a bearing at the middle of the box for the free ends of the axles, and a cushion or yielding bearing for the axles at each end of the box, substantially as herein described.

7. In a vehicle, the independent axles B B', each having a wheel secured to it so that wheel and axle rotate together, in combination with the box G, confining the axles between the wheels, a bearing at the middle of the box for the free ends of the axles, and a bearing for the axles at each end of the box, consisting of the gland-nut I, encircling the axle, and the cushion H, encircling the nut, substantially as herein described.

8. In a vehicle, the independent axles B B', each having a wheel secured to it so that wheel and axle rotate together, in combination with the box G, confining the axles between the wheels, a bearing at the middle of the box for the free ends of the axles, and a bearing for the axles at each end of the box, consisting of the gland-nut I, encircling the axle, the cushion H, encircling the nut, and the screw-cap J, of rubber, on the end of the nut and embracing the axle to prevent the entrance of dust to the journal, substantially as herein described.

9. In a vehicle, the independent axles B B', each having a wheel secured to it so that wheel and axle rotate together, in combination with the box G, confining the axles between the wheels and having a hinged side g, the cushion-bearings for the axles at the ends of the box, and the two-part bearing K at the middle of the box for the free ends of the axles, substantially as herein described.

10. In a vehicle, the wheels A A', the independent axles B B', the cushions C and D in the ends of the wheel-hubs, and the collar and nut on the axles bearing against the cushions, whereby wheel and axle are secured to each other and adapted to rotate together, in combination with the box G, confining the axles from hub to hub, the gland-nut I, cushion H, and screw-guard cap J in each end of the box forming bearings for the axles, and the bearing K at the center of the box for the free ends of the axles, substantially as herein described.

In witness whereof I have hereunto set my hand.

JACOB GARDNER KENYON.

Witnesses:
S. H. NOURSE,
H. C. LEE.